United States Patent [19]

Zumstein

[11] 4,346,559
[45] Aug. 31, 1982

[54] BYPASS CONTROL APPARATUS FOR TURBOCHARGED INTERNAL-COMBUSTION ENGINES

[75] Inventor: Bruno Zumstein, Lucerne, Switzerland

[73] Assignee: BBC Brown, Boveri & Company Limited, Baden, Switzerland

[21] Appl. No.: 159,607

[22] Filed: Jun. 16, 1980

[30] Foreign Application Priority Data

Jul. 11, 1979 [CH] Switzerland ............ 6462/79

[51] Int. Cl.³ ............................................. F02B 37/00
[52] U.S. Cl. ........................................ 60/606; 60/611
[58] Field of Search ............... 60/606, 600, 601, 602, 60/603

[56] References Cited

U.S. PATENT DOCUMENTS

| 2,684,569 | 7/1954 | Buchi | 60/611 X |
| 2,710,521 | 6/1955 | Nettel | 60/606 X |
| 3,163,984 | 1/1965 | Dumont | 60/606 |
| 3,270,495 | 9/1966 | Connor | 60/602 |

FOREIGN PATENT DOCUMENTS

| 624301 | 1/1936 | Fed. Rep. of Germany | 60/602 |
| 1040839 | 10/1958 | Fed. Rep. of Germany | 60/606 |
| 2284040 | 4/1976 | France | 60/606 |

Primary Examiner—Michael Koczo
Attorney, Agent, or Firm—Werner W. Kleeman

[57] ABSTRACT

A bypass control apparatus for turbocharged internal-combustion engines, comprising an actuating cylinder for the bypass valve of the bypass control apparatus, wherein the pressure of a hydraulic fluid in the actuating cylinder is controlled by a volume flow which is proportional to the engine speed. The hydraulic fluid is returned into a hydraulic tank through a throttle line or pipe containing a fixedly adjustable throttle. The throttle line branches off a hydraulic line or pipe at a location upstream of the actuating cylinder.

2 Claims, 2 Drawing Figures

BYPASS CONTROL APPARATUS FOR TURBOCHARGED INTERNAL-COMBUSTION ENGINES

CROSS-REFERENCE TO RELATED CASES

This application is related to my commonly assigned U.S. application Ser. No. 06/159,608, filed June 16, 1980, entitled "Bypass Control Apparatus for Turbocharged Internal-combustion Engines", and my commonly assigned U.S. application Ser. No. 06/159,606 filed June 16, 1980, entitled "Bypass Control Apparatus for Turbocharged Internal-Combustion Engines".

BACKGROUND OF THE INVENTION

The present invention relates to a new and improved construction of a bypass control apparatus or mechanism for turbocharged internal-combustion engines.

Generally speaking, the bypass control apparatus of the present development is of the type having an opening characteristic which is dependent upon the engine speed for a bypass valve located in a bypass line or pipe which connects a point of a boost or charging air pipe, located downstream of a compressor, with a point or location of an exhaust gas pipe located upstream of the turbine inlet.

As is well known in this technology, bypass mechanisms can be used to improve the partial load behaviour of turbocharged internal-combustion engines. In such cases, a fraction of the compressed boost air, which is a function of the momentary or instantaneous operating state of the engine, is withdrawn through a bypass line or pipe and delivered to a point or location of the exhaust gas pipe located upstream of the exhaust gas turbine. In this way, the engine receives more air than in the case of turbocharging without a bypass. For this purpose the bypass apparatus possesses a bypass valve which may be controlled by any engine load-dependent parameter or quantity and serving as a control magnitude. The valve-lift then is accomplished such that a large quantity of air is transferred during the no-load and lower partial load ranges and with increasing load a progressively decreasing quantity of air is transferred, until the valve completely closes near the full-load point of the engine and the transfer of bypass air is suppressed.

With a heretofore known bypass apparatus there is employed, for instance, as the control magnitude for controlling the bypass air stream, the pressure differential prevailing across the bypass between the compressed boost air and the exhaust at the turbine inlet.

It has already been proposed to utilize the engine speed as a control magnitude or quantity, but to the extent presently known, this concept has not yet been realized.

SUMMARY OF THE INVENTION

It is a primary object of the present invention to provide a new and improved bypass control apparatus for turbocharged internal-combustion engines wherein the engine speed is beneficially employed as a control quantity for controlling the bypass air stream.

Another object of the present invention aims at providing a new and improved bypass control apparatus for turbocharged internal-combustion engines, which is relatively simple in construction and design, economical to manufacture, extremely reliable in operation, requires very little maintenance and servicing and enables utilization of the engine speed as a control quantity or parameter for controlling the bypass air stream.

Now in order to implement these and still further objects of the present invention, which will become more readily apparent as the description proceeds, the bypass control apparatus of the present development is manifested by the features that there is provided a closed hydraulic circuit containing a volumetric hydraulic pump which is driven proportionally to the speed of the internal-combustion engine. A tank for hydraulic liquid is provided for the hydraulic pump, and an actuating cylinder cooperates with the bypass valve. A hydraulic line or pipe connects the hydraulic pump with the actuating cylinder. A throttle valve having an adjustable throttle cross-section or throughflow is provided in a throttle line or pipe between the hydraulic line or pipe and the tank.

This inventive arrangement arose from the desire to develop a bypass control apparatus wherein the engine speed could be beneficially utilized as the control magnitude or quantity. The reason for this was the planned use of such bypass control apparatus preferably in conjunction with vehicle engines, for which the engine speed is particularly suitable as control quantity or magnitude.

BRIEF DESCRIPTION OF THE DRAWINGS

The invention will be better understood and objects other than those set forth above will become apparent when consideration is given to to the following detailed description thereof. Such description makes reference to the annexed drawing wherein.

DETAILED DESCRIPTION OF THE PREFERRED EMBODIMENTS

Figure 1:
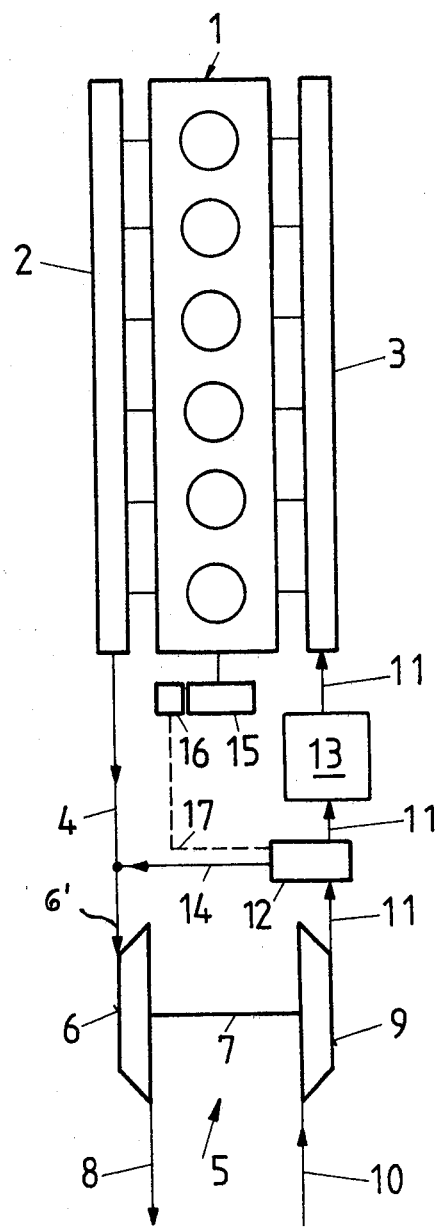
FIG. 1 schematically illustrates a turbocharged engine provided with a bypass control apparatus according to the invention.

Describing now the drawings, in FIG. 1 there is schematically illustrated a six-cylinder turbocharged engine 1 which contains an exhaust gas manifold 2 and a boost air container or receiver 3. The exhaust gases pass through an exhaust gas pipe or conduit 4 into an exhaust gas turbine 6 of a turbocharger 5, leaving the latter through an exhaust pipe or conduit 8. The exhaust gas turbine 6 is connected by means of a shaft 7 with a compressor 9, which sucks-in air through an intake pipe or line 10 and forces such sucked-in air, in a compressed state, by means of a boost air pipe or line 11 through a bypass control housing 12 into a boost air cooler 13 and further into the boost air container or receiver 3, from which the cylinders of the engine 1 receive their combustion air. A bypass pipe or line 14 connects the bypass control housing 12 to a point of the exhaust gas pipe 4 which is located upstream of the inlet 6' into the turbine 6. The bypass control apparatus further comprises a volumetric hydraulic pump or equivalent structure, capable of being driven by the engine flywheel 15. As the volumetric hydraulic pump 16 there can be advantageously employed a conventional gear pump. Furthermore, the bypass control apparatus comprises a hydraulic line or pipe 17 extending between the volumetric hydraulic pump 16 and the bypass control housing 12.

As the hydraulic fluid medium there is preferably used oil.

Figure 2:
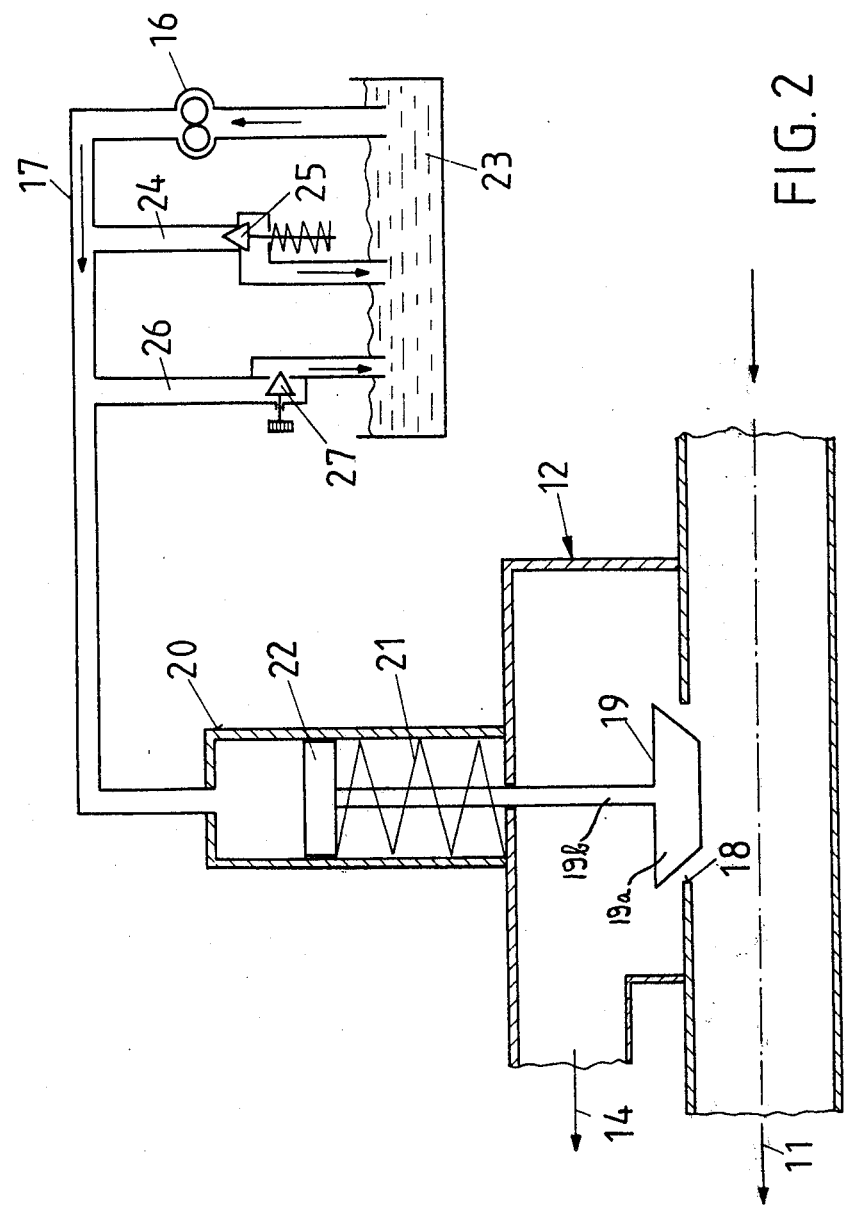
FIG. 2 illustrates details of the bypass control apparatus according to the invention used in the arrangement of FIG.1.

Now in FIG. 2 there is schematically illustrated details of the bypass control apparatus. As will be seen, the bypass control housing 12 communicates by means of a valve orifice or opening 18 with the boost air pipe or line 11 and by means of the bypass line or pipe 14 with the exhaust gas pipe 4. A bypass valve 19 cooperating with the valve orifice or opening 18 is constructed as a plate or disc valve 19a which is provided at the upper end of its valve stem 19b with a piston 22 slidably arranged within an actuating cylinder 20. This piston 22 is loaded by a compression or pressure spring 21.

Arranged in parallel with the hydraulic pump 16, which sucks hydraulic fluid out of the hydraulic tank 23, is a return flow line or pipe 24 provided with a pressure limiter valve 25, and a throttle line or pipe 26 equipped with a throttle valve 27 which can be adjusted to the relevant compressor and bypass characteristic. The return flow line or pipe 24 is located between the hydraulic tank or reservoir 23 and the hydraulic pipe or line 17 which opens into the actuation cylinder 20. The throttle valve 27 ensures, by means of its throttle characteristic, that the oil delivered by the hydraulic pump 16 into the hydraulic line or pipe 17 generates a pressure which increases with the speed of the engine and hence of the pump 16, so that the bypass valve 19, which is initially maintained fully opened by the compression spring 21, in the no-load and lower speed ranges of the internal-combustion engine 1, closes progressively, and thus, gradually reduces the bypass flow or stream through the bypass line or pipe 14 until, just prior to attaining the full-load state, the valve orifice 18 is fully closed and there is thus interrupted the bypass stream or flow. Any further increase in the pressure is prevented by the pressure limiter valve 25, which enables surplus oil to escape back into the tank 23.

By virtue of its simple construction and the reliable manner in which the delivery or feed characteristic of the pump 16 and the throttle characteristic of the throttle valve 27 can be determined, the bypass stream of such bypass control apparatus, which is a function of the engine speed, can be readily adapted to the requirements of the relevant engine.

The engine speed is a definite control quantity of parameter, which is particularly suitable for engines which, during operation, work with a speed boost.

While there are shown and described present preferred embodiments of the invention, it is to be distinctly understood that the invention is not limited thereto, but may be otherwise variously embodied and practiced within the scope of the following claims. Accordingly,

What I claim is:

1. In a bypass control apparatus for turbocharged internal-combustion engines having an opening characteristic dependent upon the engine speed for a bypass valve, the bypass valve being located in a bypass line which connects a point of a boost air line located downstream of a compressor with a point of an exhaust gas pipe located upstream of the turbine inlet of the engine turbocharger, the improvement which comprises:
   means defining a closed hydraulic circuit;
   said closed hydraulic circuit containing:
   a volumetric hydraulic pump driven proportionally to the speed of the internal-combustion engine;
   a tank for a hydraulic liquid for the hydraulic pump;
   an actuating cylinder for the bypass valve;
   a hydraulic line for connecting the hydraulic pump with the actuating cylinder;
   a throttle line arranged between the hydraulic line and the tank; and
   a throttle valve provided with an adjustable flow cross-section provided in said throttle line between said hydraulic line and said tank and serving to control the volumetric flow of the hydraulic liquid through said hydraulic line to said actuating cylinder for the bypass valve.

2. The improvement as defined in claim 1, further including:
   a return line provided with a pressure limiter valve arranged between the hydraulic line and the tank.

* * * * *